United States Patent [19]

Bakx et al.

[11] Patent Number: 5,418,773
[45] Date of Patent: May 23, 1995

[54] ZONED RECORD CARRIER

[75] Inventors: Johannus L. Bakx; Paulus G. P. Weijenbergh, both of Eindhoven, Netherlands; Karl A. Belser, San Jose, Calif.; Glen A. Jaquette, Tucson, Ariz.; John E. Kulakowski, Tucson, Ariz.; Judson A. McDowell, Tucson, Ariz.; Rodney J. Means, Tucson, Ariz.

[73] Assignees: International Business Machines Corporation, Armonk; U.S. Philips Corporation, New York, both of N.Y.

[21] Appl. No.: 86,960

[22] Filed: Jul. 2, 1993

[30] Foreign Application Priority Data

Jul. 3, 1992 [EP] European Pat. Off. ........... 92202031

[51] Int. Cl.⁶ .............................................. G11B 7/00
[52] U.S. Cl. .............................. 369/275.1; 369/275.3; 369/44.26
[58] Field of Search ............... 369/275.1, 275.3, 275.4, 369/111, 44.26

[56] References Cited

U.S. PATENT DOCUMENTS

| | | | |
|---|---|---|---|
| 4,530,018 | 7/1985 | Hoshino et al. | 360/73 |
| 4,866,686 | 9/1989 | Verboom | 369/32 |
| 5,138,599 | 8/1992 | Fukushima et al. | 369/275.3 |
| 5,144,552 | 9/1992 | Abe | 369/275.4 |
| 5,255,261 | 10/1993 | Iida et al. | 369/275.3 |
| 5,278,814 | 1/1994 | Deguchi et al. | 369/275.3 |

FOREIGN PATENT DOCUMENTS

| | | |
|---|---|---|
| 0189948 | 8/1986 | European Pat. Off. . |
| 0310162 | 4/1988 | European Pat. Off. . |
| 0306324 | 3/1989 | European Pat. Off. . |
| 0555065 | 2/1993 | European Pat. Off. . |
| 3724622 | 1/1988 | Germany . |

OTHER PUBLICATIONS

"Data Interchange On 90 mm Optical Disk Cartridges, Read Only and Rewritable, M.O.", Standard ECMA-154, Jun. 1991, pp. 1–105.

*Primary Examiner*—Paul M. Dzierzynski
*Assistant Examiner*—Kiet T. Nguyen
*Attorney, Agent, or Firm*—D. A. Shifrin; Richard A. Weis

[57] ABSTRACT

A record carrier having essentially circular tracks concentrically located around a point of rotation. The record carrier is divided into circular zones each having m tracks, where m is an integer. Each track within a zone is subdivided into n sectors, where n is an integer which is constant per zone and which increases as the zone is more remote from the point of rotation. Each sector including a header portion and a data portion. The header portions in the radial direction in each zone are in line. In each zone the condition of $m*n=j*k$ is satisfied, where is j an integer greater than or equal to 2 and is constant for each zone, and k is an integer.

7 Claims, 2 Drawing Sheets

ZONED RECORD CARRIER

BACKGROUND OF THE INVENTION

The invention relates to a record carrier comprising substantially circular tracks situated concentrically around a point of rotation, the record carrier being divided into ring-shaped zones each comprising m tracks, with m being an integer, each track in a zone being subdivided into n sectors, with n being an integer which is constant per zone and increases according as the zone is further remote from the point of rotation, each sector comprising a header portion and a data portion and, in radial direction, the header portions in each zone being in line.

A record carrier of the type defined in the opening paragraph is known, for example, from U.S. Pat. No. 4,530,018. Such record carriers are often denoted by the term of zoned record carriers. A track number and a sector number are assigned to each sector, the track number denoting which track the relevant sector resides in, and the sector number denoting the location of the relevant sector in the track. A desired sector is addressed on the basis of the track number and the sector number assigned to this sector.

When a specific sector is to be sought to be read out or written, control systems in equipment which is coupled to the read/write device supply control commands in which the sectors to be read out or written are specified by their track addresses and sector addresses.

Due to the differences in the numbers of sectors per track, the (software) drivers for driving the device for reading and writing of zoned discs will customarily differ considerably from drivers for the device for the reading and writing of non-zoned record carriers for which the number of sectors per track over the entire record carrier is the same. For when designing the driver which sends the read and write commands to the read/write device for non-zoned record carriers, the fact that the number of sectors for each track is the same is often exploited.

This implies that existing drivers designed for read/write devices for non-zoned record carriers are often unsuitable for read/write devices for zoned record carriers. Making these existing drivers suitable then often requires considerable adaptations. This is especially disadvantageous in the case where the introduction of a zoned record carrier is desired as a successor to an already marketed non-zoned record carrier.

SUMMARY OF THE INVENTION

It is an object of the invention to provide a record carrier for which the adaptation of the control is less drastic than for the prior-art zoned record carrier.

This object is achieved by a record carrier as defined in the opening paragraph, characterized in that in each zone the condition of m*n=j*k is satisfied with j being an integer greater than or equal to 2 and being constant for each zone, and with k being an integer.

On the record carrier according to the invention the sectors in each zone may be divided into groups of j sectors. This makes it possible to define an integer number of virtual tracks in a zone, which tracks are each formed by a fixed number of sectors corresponding to the number of sectors per track on non-zoned record carriers, so that the method of addressing can remain the same for both the existing non-zoned record carriers and the zoned record carriers according to the invention. The read/write device only needs to comprise means for searching for the physical track and the sector that corresponds to the address of the virtual track and the sector.

It is to be preferred to write for each sector the virtual track address and sector address in the header portion of the relevant sector.

BRIEF DESCRIPTION OF THE DRAWINGS

The invention will be further explained with reference to the FIGS. 1 to 4, in which.

DESCRIPTION OF THE PREFERRED EMBODIMENTS

Figure 1:
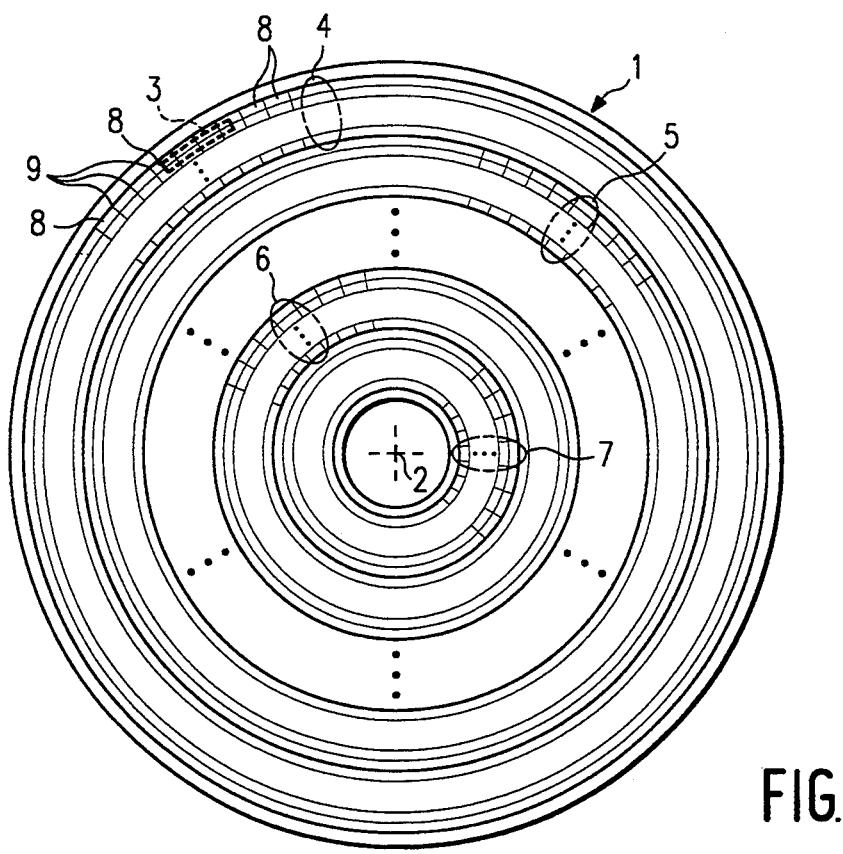
FIG. 1 is a top plan view of a record carrier according to the invention.

FIG. 1 shows a top plan view of a record carrier 1 according to the invention. The record carrier 1 comprises substantially circular tracks situated concentrically around a point of rotation 2. Data are stored and/or can be written in the tracks by writing and/or reading techniques known per se.

The tracks of the record carrier 1 are arranged in groups of an integer number m of adjacent tracks. These groups form ring-shaped zones of which FIG. 1 shows four. They are referenced 4, 5, 6 and 7.

Each track is subdivided into an integer number n of sectors 8 which comprise an equal number of channel bits, for example 725×16 channel bits. In each zone the number of sectors per track (turn) is equal. Each sector comprises a so-called header portion 9 in which control information is written for controlling the writing and/or reading of information. In each zone the header portions of the sectors are in line in radial direction. Furthermore, each sector comprises a data portion in which user information is written or can be written.

The total number of sectors in each zone is an integer multiple of j, with j being an integer greater than or equal to 2. Worded differently, in each zone the condition of m*n=j*k is satisfied, with m denoting the number of tracks in the zone, with n denoting the number of sectors per track, with j being a constant integer which is the same for each zone and with k being an integer. As a result, it is possible to divide the sectors in each zone into an integer number of groups of j consecutive sectors each. These groups of j sectors will further be denoted virtual tracks or logic tracks.

The distribution of the sectors over the virtual (logic) tracks is advantageous in that the driving programs (drivers) for issuing read and write commands to the read/write device may essentially remain equal to prior-art driving programs developed for record carriers on which the number of sectors per track (turn) is constant over the entire record carrier. The number of sectors in a logic track is then selected to be equal to the number of sectors per track as they occur on the record carriers already available on the market. Since the target sectors in the control commands can be indicated in the same manner, the driving programs can remain unchanged. The read/write device only needs to comprise searching means that search for the physical track and sector belonging to an address of a virtual track and sector specified in the control commands. This requires only a minor adaptation, so that it is possible to jump rapidly to the location of the addressed target sector on the basis of a given virtual track address and sector address. Since the relation between the virtual track address and sector address is known in advance, this may be realised in a very simple manner.

The record carrier may be of a type which is readable and/or writable by magnetic, magnetooptical or optical means. However, the invention is not restricted to this. To illustrate the invention, a record carrier of a magnetooptical type will be described hereinafter by way of example. On such a type of record carrier the positions of the tracks are often determined by a spiral-shaped groove made in a transparent substrate. The tracks may then be formed by the windings of the spiral-shaped groove or by the lands located between the successive windings of the groove. Alternatively, it is possible to have a number of concentric circular grooves in lieu of a spiral-shaped groove in the substrate.

Furthermore, there should be observed that the tracks may be formed by so-called servo patterns in lieu of grooves.

For a detailed description of a record carrier in which the tracks are formed by so-called servo patterns, reference be made to U.S. Pat. No. 4,866,686 (PHQ 86006) and EP-A-0 310 162 (PHQ 87029), which documents are herewith incorporated in the description by reference. For a detailed description of a record carrier, in which the tracks are formed by grooves in a substrate, reference be made to EP-A-0 189 948 (PHN 11.261), EP-A-0 306 324 and DE-OS-3 724 622, which documents are also incorporated in this description by reference.

Figure 2:
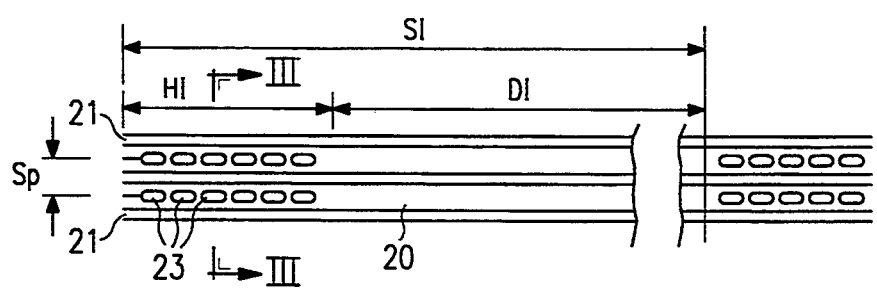
FIG. 2 is a detailed representation of the top plan view shown in FIG. 1.
Figure 3:
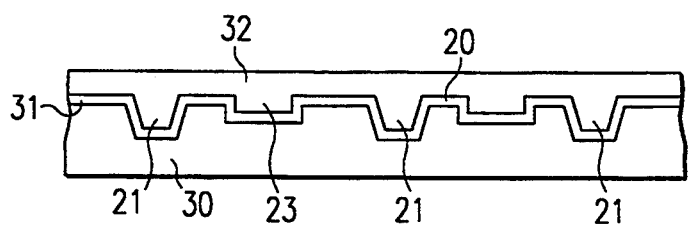
FIG. 3 is a cross-section of the detailed representation.

FIG. 2 gives a detailed representation of a portion 3 of the top elevation of the record carrier 1 for the case where the positions of the tracks are determined by grooves in a substrate. The cross-section of the portion 3 along the line III—III is shown in FIG. 3. In the FIGS. 2 and 3 the grooves are referenced 21. The lands 20 between the grooves 21 form the tracks in which the information is written or can be written. The substrate is denoted by the reference numeral 30. The side of the substrate 30 in which the grooves 21 are made is coated with a magnetooptical recording layer 31 of a customary type, in which an optically detectable pattern of magnetic domains which represents the written information may be formed. The recording layer 31 is covered with a protective layer 32. The length of a sector is referenced S1 in FIG. 2. The pitch of the track, i.e. the distance between the centres of adjacent tracks 20, is denoted Sp.

The length of the header portion of the sector is referenced H1. The length of the data portion of the sector is referenced D1. The header portion has an optically detectable pattern of pits 23. This pattern is of a customary type which permits recognizing the header portion and deriving a clock signal related to the data rate of the signal to be written and/or to be read out. The pit pattern in the header portion further represents an address. The address contains a part denoting a track number and a part denoting a sector number in the track. Preferably, the track number denotes the serial number of the virtual (logic) track on the record carrier and the sector number denotes the serial number of the sector in the virtual track. In that case the address information in the header portion directly indicates the serial number of the logic track and the serial number of the sector in the logic track. However, it is alternatively possible to have the header portion include the serial number of the physical track in lieu of the serial number of the virtual track.

The record carrier according to the invention is preeminently suitable as a successor to a non-zoned record carrier in which the number of sectors along the periphery of the record carrier is constant over the entire record carrier. Such a record carrier, for example, is the prior-art 90 mm magnetooptical disc as defined in EC-MA-154 standard "Data interchange on 90 mm optical Disc cartridges, read-only and rewritable, M.O.", June 1991. For these 90 mm record carriers the number of sectors along the periphery is equal to 25. The total number of bytes per sector (header portion plus data portion) is 725. Each byte corresponds to 16 channel bits in the sector.

For a record carrier according to the invention suitable as a successor to said record carrier according to the ECMA standard, the number of sectors per zone is to be a multiple of 25. In addition, the radial distance from the first track of the first zone to the point of rotation is preferably equal to the value of 24 mm prescribed by the ECMA standard. The radial position of the last track of the last zone is preferably equal to the value of 40 mm prescribed by the ECMA standard. Furthermore, the reference data clock frequency for the standard record carrier as well as its successor should preferably be simply derived by the same frequency synthesizer. Given these marginal conditions, a value for the number of sectors per track and for the number of tracks per zone is to be sought for which the track pitch additionally has a dimension suitable for optical reading, i.e. a track pitch of the order of 1.5 $\mu$m.

A suitable set of parameters that satisfy the conditions mentioned hereinbefore will be represented in Table 1 below.

TABLE 1

| | |
|---|---|
| radial position of first track in first zone | 24 mm |
| radial position of last track in last zone | 40 mm |
| track pitch | 1.391 $\mu$m |
| number of sectors/track in first zone | 30 |
| number of zones | 10 |
| increase of sectors | 2/zone |
| number of physical tracks/zone | 1150 |
| number of virtual tracks in first zone | 1380 |
| increase in virtual tracks | 92/zone |

For this set of parameters the length of each of the sectors in the first track of each zone is equal to 5 mm. The length of each sector (header portion plus data portion) corresponds to 725 bytes, each data byte being represented by 16 channel bits in the sector. With a speed of rotation of 30 Hz the reference data clock frequency fref is M/15*10.44 MHz for writing or reading, with M having the values of 15, 16, 17, . . . , 24 for the first, second, third, . . . , tenth zone respectively.

Such a series of frequencies may be simply obtained with frequency synthesizers known per se. Since the number of sectors along the periphery of previously mentioned standard record carriers is equal to 25, and the sector length for the standard record carrier is equal to that of the successor, the frequency fst of the reference data clock signal for said standard record carrier is equal to 25/30*fref. This frequency fst may be simply derived by the frequency synthesizer by taking the value of 15 for N and selecting the value of 25 for M, and dividing the value thus obtained by 2.

This embodiment further has the advantage that the driving programs for driving the reading of the record carrier according to said ECMA standard needs to be adapted only to a minor degree. For, the length of the virtual tracks, the number of sectors per virtual track, and the number of channel bits per sector are the same for the record carrier according to the ECMA standard and for the record carrier as determined by the parameters in said Table.

Said known standard record carrier comprises a commonly termed lead-in and a lead-out which contain useful information for the reading and writing control. Though not necessarily, the format (number of sectors along the periphery, the assembly of the sector, and the associated data clock frequency) for said standard record carrier and its successor should preferably be chosen to be the same. This is advantageous in that the lead-in and the lead-out can be directly read out irrespective of the type of record carrier. In the case where the lead-in and the lead-out of the two record carriers do not have the same format, the format is to be determined prior to the reading of the record carrier, which is unnecessarily time-consuming.

Since the pit patterns in the header portions in each zone are in line in radial direction, crosstalk by the pit patterns in the header portions when data portions are read out is eliminated. The header portions of a record carrier often comprise what is commonly referred to as a gap, which does not contain any previously written control information and forms the end of the header portion. During recording, the time interval in which the gap is scanned is used for switching the read/write device from a read status (for reading the previously written information in the header portions) to a write status (for writing information in the data portion which follows the header portion). It is likewise advantageous to use this gap for controlling the writing intensity as described, for example, in European patent application No. 92203535.7 (PHN 14279). A magnetic domain is then written in the gap to determine the desired intensity. This domain is then written by a radiation pulse of a considerably longer duration than that of the radiation pulses which are used for writing domains in the data portion. This means that the domain in the gap has a greater width than the domains written in the data portions. If these domains in the gap were not in line as they are in the arrangement according to the invention, the presence of domains of greater width in the gap would lead to considerable crosstalk when adjacent data portions are read out.

The record carrier as determined by the parameters in Table 1 has a considerably larger storage capacity than known record carriers according to the ECMA standard.

Table 2 mentioned below will show the parameters for a further embodiment of the record carrier according to the invention, suitable as a successor to the record carrier according to the ECMA standard mentioned before.

TABLE 2

| radial position of first track in first zone | 24 mm |
| radial position of last track in last zone | 40 mm |
| track pitch | 1.29 μm |
| number of sectors/track in first zone | 31 |
| number of zones | 20 |
| increase of sectors | 1/zone |

TABLE 2-continued

| number of physical tracks/zone | 600 |
| number of virtual tracks in first zone | 744 |
| increase of virtual tracks | 24/zone |

For a speed of rotation of 30 Hz and a number of channel bits per sector equal to 725*16, the reference data clock frequency in the first zone is 10.788 MHz.

Table 3 below will show the parameters for yet another embodiment of the record carrier according to the invention, suitable as a successor to the record carrier according to the ECMA standard mentioned before.

TABLE 3

| radial position of first track in first zone | 24 mm |
| radial position of last track in last zone | 40 mm |
| track pitch | 1.345 μm |
| number of sectors/track in first zone | 31 |
| number of zones | 20 |
| increase of sectors | 1/zone |
| number of physical tracks/zone | 575 |
| number of virtual tracks in first zone | 713 |
| increase of virtual tracks | 23/zone |

For a speed of rotation of 30 Hz and a number of channel bits per sector equal to 725*16, the reference data clock frequency in the first zone is 10.788 MHz.

Figure 4:
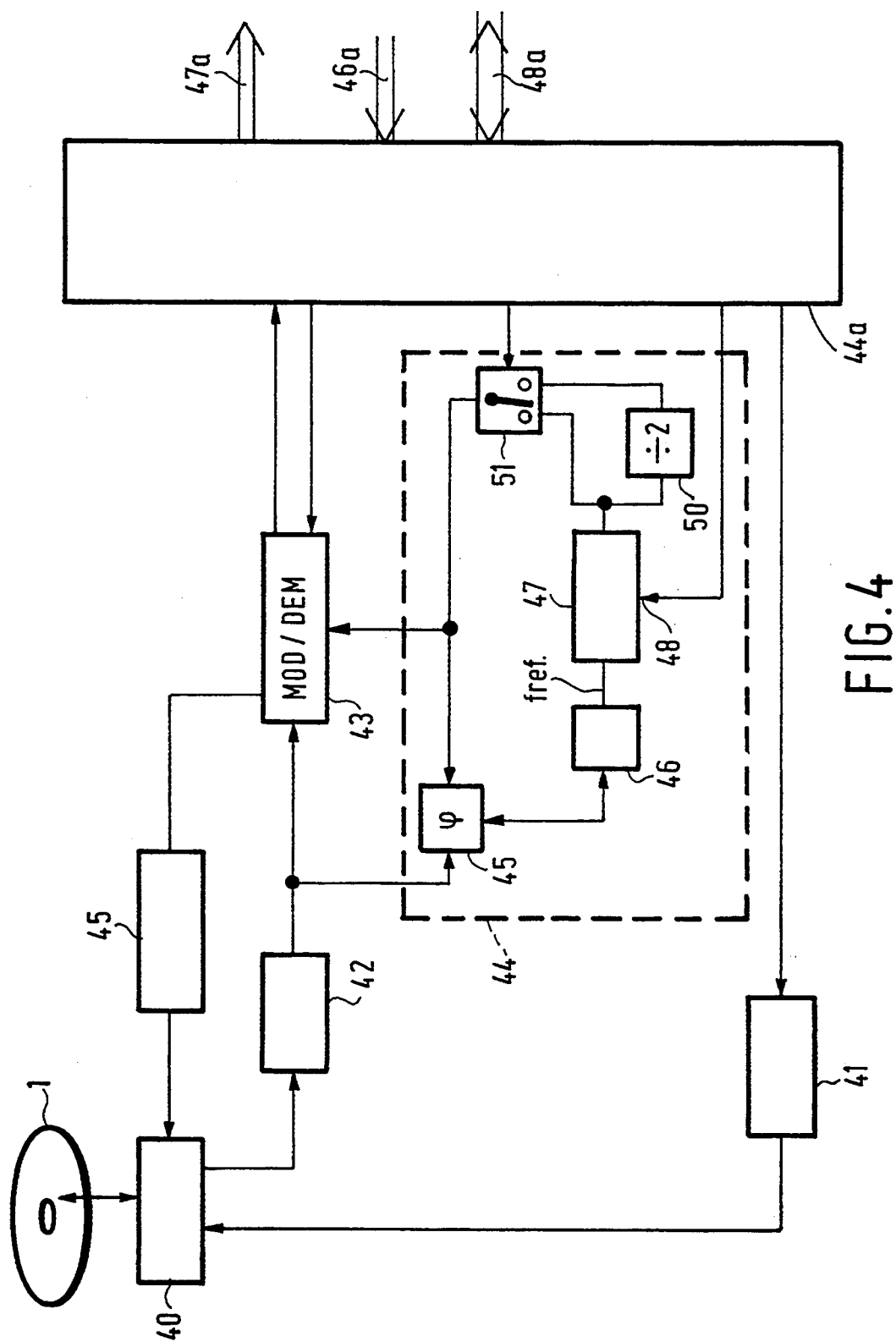
FIG. 4 shows an arrangement for reading and writing information from and on the record carrier according to the invention.

FIG. 4 schematically shows a device for writing and reading data on/from the record carrier 1. The device comprises an optical scanning unit 40 of a customary type for scanning with a radiation beam the record carrier 1 which is driven with a constant angular velocity by a drive motor (not shown). The scanning unit 40 comprises a laser (not shown) for generating the radiation beam. The laser is controlled by a laser control circuit 45 of a customary type, by which the intensity of the radiation beam generated by the laser is maintained at a constant reading level during reading and by which, during writing, the intensity of the radiation beam is switched between a low level, at which no optically detectable change takes place in the recording layer, and a high level, at which an optically detectable change takes place in the recording layer in accordance with a switch pattern related to the information to be written. For controlling the scanning operation the scanning unit 40 is coupled to a servo unit 41 of a type which keeps a focal point of the radiation beam in the plane of the recording layer 31 in a customary fashion, and which further keeps the radiation beam focused on the track 20. It is likewise possible, with the aid of the servo unit 41, to have the focal point of the radiation beam on the recording layer jump over a desired number of tracks.

A detection signal modulated in accordance with the information patterns in the portion of the track 20 scanned by the radiation beam is applied to a modulation/demodulation unit 43 and to a clock regeneration unit 44 through a signal processing unit 42. The clock regeneration unit 44 comprises an oscillator 46 controlled by a phase comparator circuit 45. The oscillator 46 generates a periodic signal with a frequency equal to fref. This periodic signal is applied to a frequency synthesizer which derives therefrom a reference data clock signal which has a frequency equal to (N/M)*fref, with M being a constant integer and N an integer adjustable via a control input 48. In the case where the record carrier determined by the parameters in Table 1 is used, M is equal to 15 and M can be adjusted to the values of 15, 16, 17, ..., 24 by the interface unit 44a coupled to a control input 48 for the adjustment. The reference data clock signal produced by the frequency synthesizer 47 is applied to the phase comparing circuit 45 which compares the phase of the reference data clock signal with the phase of the detection signal produced by the signal processing unit 42. Depending on an output signal of the phase comparing circuit 42, the frequency of the oscillator is kept at a value for which the phase difference between the detection signal and the reference data clock signal remains, in essence, constant.

In the embodiment represented in FIG. 4 the output signal of the frequency synthesizer is applied to a frequency divider 50 which produces a signal having a frequency that is half the frequency of the received signal. By setting the value of M to 25 through the control input 48, a signal will be available on the output of the frequency divider 50 whose signal frequency is equal to that of the reference data clock signal as it is desired for reading said standard record carrier with 25 sectors per turn. By means of a selection circuit 51 controlled by the interface unit, the reference data clock signal necessary for the record carrier according to the invention or the reference clock signal necessary for said standard record carrier can be selected as required.

The reference data clock signal generated by the clock regeneration unit 44 is applied to the modulation/demodulation unit 43 for controlling the modulation or demodulation performed by the modulation/demodulation unit 43. For applying modulated information to the laser control circuit 45, an output of the unit 43 is coupled to the laser control circuit 45. The laser control circuit is of a customary type which controls a laser, residing in the scanning unit, for generating the radiation beam in such a way that the radiation beam is modulated, so that an information pattern corresponding to the modulated signal is made in the scanned portion of the record carrier. For conveying read and demodulated information and feeding information to be modulated and written, the unit 43 is coupled to an interface unit 44a. The interface unit 44a comprises a data input port 46a and a data output port 47a as well as a control port 48a for exchanging information with other equipment such as a computer system. The interface unit 44a is of a type in which through the control port 48a control commands can be supplied for causing information fed through the data input port to be written, or for causing information to be read from the record carrier, and causing the read information to be conveyed through the data output port. The control commands then state from/in which virtual tracks and sectors the information is to be read/written. As a result of the use of virtual tracks and sectors, the format in which control information is exchanged between the interface unit and other equipment may remain equal to the format as already used for reading and writing equipment already available on the market, such as equipment designed for reading and writing information from/on the record carrier specified according to said ECMA standard.

The interface unit 44a comprises generation means which generate from the control commands arriving through the control port 48a the necessary control signals for controlling the reading and writing process. Based on the addresses of the virtual tracks and sectors specified in the control instructions, there is then determined in which physical track and in which zone the addressed track resides. Then the servo unit is supplied with the necessary control signals to jump to the physical track in which the addressed sector resides. In addition, the control input of the frequency synthesizer is supplied with the value of N which relates to the relevant zone, so that the reference data clock frequency is adjusted to the value assigned to this zone.

We claim:

1. A record carrier comprising substantially circular tracks situated concentrically around a point of rotation, the record carrier being divided into ring-shaped zones each comprising m tracks, where m is an integer, each track in a zone being subdivided into n sectors, where n is an integer which is constant within each zone and increases as each zone is further remote from the point of rotation, the sectors in a zone being arranged in groups of j consecutive sectors, where j is an integer greater than 2 and is constant for each zone, each sector comprising a header portion and a data portion and the header portions in each zone being in line with each other in a radial direction, wherein in each zone the condition of $m*n=j*k$ is satisfied, where k is an integer.

2. A record carrier as claimed in claim 1, wherein each header portion comprises an address which indicates to which group of j consecutive sectors the relevant sector belongs and denotes the serial number of the relevant sector in the group indicated by the address.

3. A record carrier as claimed in claim 2, wherein m is equal to 1150, j is equal to 25, the tracks have a constant track pitch substantially equal to 1.391 $\mu$m, and the track which is located in the zone nearest to the point of rotation has sectors that have a length substantially equal to 5 mm.

4. A record carrier as claimed in claim 3, wherein the distance from the point of rotation to the track nearest to the point of rotation, which track is located in the zone nearest to the point of rotation, is substantially equal to 24 mm, where n for this zone is equal to 30.

5. A record carrier as claimed in claim 1, wherein m is equal to 1150, j is equal to 25, the tracks have a constant track pitch substantially equal to 1.391 $\mu$m, and the track which is located in the zone nearest to the point of rotation has sectors that have a length substantially equal to 5 mm.

6. A record carrier as claimed in claim 5, wherein the distance from the point of rotation to the track nearest to the point of rotation, which track is located in the zone nearest to the point of rotation, is substantially equal to 24 mm, where n for this zone is equal to 30.

7. A record carrier comprising substantially circular tracks situated concentrically around a point of rotation and having a constant track pitch substantially equal to 1.391 $\mu$m, the record carrier being divided into ring-shaped zones each comprising 1150 tracks, each track in a zone being subdivided into n sectors, where n is an integer which is constant within each zone and increases as each zone is further remote from the point of rotation, the sectors in a zone being arranged in groups of 25 consecutive sectors, each sector comprising a header portion and a data portion and the header portions in each zone being in line with each other in a radial direction, wherein in each zone the condition of $1150*n=25*k$ is satisfied, where k is an integer, wherein further, the track which is located in the zone nearest to the point of rotation is located a distance substantially equal to 24 mm from the point of rotation, has sectors that have a length substantially equal to 5 mm and n for this zone is equal to 30.

* * * * *